(12) United States Patent
Bohlken

(10) Patent No.: US 6,952,977 B2
(45) Date of Patent: Oct. 11, 2005

(54) WEIGHT COMPENSATION DEVICE

(75) Inventor: Wolfgang Bohlken, Friedberg (DE)

(73) Assignee: Kuka Roboter GmbH, Augsburg (DE)

(*) Notice: Subject to any disclaimer, the term of this patent is extended or adjusted under 35 U.S.C. 154(b) by 9 days.

(21) Appl. No.: 10/349,221

(22) Filed: Jan. 22, 2003

(65) Prior Publication Data

US 2003/0106390 A1 Jun. 12, 2003

Related U.S. Application Data

(63) Continuation of application No. 09/820,103, filed on Mar. 28, 2001, now abandoned.

(30) Foreign Application Priority Data

Mar. 28, 2000 (DE) .......................................... 100 15 411

(51) Int. Cl.$^7$ ................................................. B25J 17/00
(52) U.S. Cl. ........................ 74/490.01; 901/48; 92/90; 267/150
(58) Field of Search ........................ 74/490.01; 901/48; 92/90, 261; 267/150

(56) References Cited

U.S. PATENT DOCUMENTS

| 4,653,975 A | * | 3/1987 | Akeel .......................... 414/720 |
| 5,931,071 A | * | 8/1999 | Mori .............................. 83/74 |
| 6,246,924 B1 | * | 6/2001 | Holdgreve ................... 700/218 |
| 6,640,599 B1 | * | 11/2003 | Persson ....................... 72/210 |

* cited by examiner

*Primary Examiner*—Robert A. Siconolfi
(74) *Attorney, Agent, or Firm*—McGlew and Tuttle, P.C.

(57) ABSTRACT

A robot is provided with a robot weight compensation device having at least one hose element including an internally pressurized gas-tight inner hose portion cooperating with a high tensile strength outer portion. The high tensile strength outer portion includes non-elongatable fibers oriented relative to an axis of the at least one hose element by an angle not equal to 0° and 90°. An outer flexible protective jacket covers the fibers. A first fixing element is fixed to a first end of the hose element. The fixing element is connected to a first part of the robot. A second fixing element is fixed to a second end of the hose element. The second fixing element is articulated to a second part of the robot being movable relatively to the first robot element.

20 Claims, 3 Drawing Sheets

WEIGHT COMPENSATION DEVICE

This is a Continuation of application Ser. No. 09/820,103 filed Mar. 28, 2001, now abandoned and the entire disclosure of this prior application is considered to be part of the disclosure of the accompanying application and is hereby incorporated by reference therein.

FIELD OF THE INVENTION

The invention relates to a weight compensation device on a robot.

BACKGROUND OF THE INVENTION

Weight compensation devices are provided on a robot, so that the motors for the individual elements only carry out the movement work and only have to compensate to a limited extent or not at all forces and torques caused by gravitation. This more particularly applies to the rocker of a robot and its movement about the horizontal A2 axis relative to the robot carrousel and base.

Weight compensation devices have been provided with or proposed to have counterweights, mechanical springs, fluid springs in the form of pneumatic and hydraulic cylinders with pistons movable axially therein, magnetic systems, as well as lever and cable systems.

Each of the known weight compensation devices suffers from disadvantages. Thus, counterweights require a large amount of space and also increase the mass and inertia of the overall robot. Mechanical springs are relatively large if they are to apply the necessary forces and consequently have a considerable size. Fluid springs are not maintenance-free and may require the connection to a pressure medium, e.g. in a pressure container. Lever and cable systems are complicated and costly. Magnetic systems are also relatively large.

The problem of the invention is to provide a weight compensation device which both avoids the aforementioned disadvantages and requires little space and has a low weight and more particularly ensures a high flexibility in use.

SUMMARY OF THE INVENTION

According to the invention the set problem is solved by a weight compensation device on a robot by at least one tension-proof, internally pressurized hose element fixed by fixing elements and where in particular a plurality of parallel tension-proof, pressurized hose elements fixed by their ends to common fixing elements are provided.

Apart from a limited space requirement due to the slender construction provided by the invention the device has a limited weight and is also maintenance-free. It is also substantially free from wear. As a result of the tight construction of the hose elements it can also be used in clean rooms. It is also easy to manufacture and inexpensive. Moreover no lubricants are required. In the device according to the invention high flexibility results from the fact that the length can easily be chosen as a function of the intended use and the filling pressure can be easily adapted according to the intended use. As a result of the slender construction it is also possible to incorporate the device according to the invention into a rocker or arm of a robot, i.e. it can be incorporated into its carrying elements, such as walls.

The hose elements provided according to the invention can have numerous different constructions. According to a preferred development the hose elements have a flexible, gas-tight inner hose and a substantially non-extensible, substantially non-elongatable or non stretchable (or with high tensile strength hereinafter referred to as tension-proof) fibers surrounding it and the tension-proof fibers are in particular oriented under a finite angle unequal to 0° with respect to the hose element axis. Advantageously a fibrous structure is provided in which the individual fibers cross one another, so that they have a rhombic arrangement. Although not absolutely necessary, according to a preferred development of the invention in addition to the gas-tight inner hose surrounded by the fibrous structure, there is an outer, flexible jacket surrounding both the fibrous structure and the gas-tight inner hose so as to protect them against action from the outside.

Whilst there are also numerous arrangement possibilities for the hose elements in the device according to the invention, whereby the hose elements can e.g., be tightly juxtaposed as a group, according to an extremely preferred development the hose elements coaxially surround a central axis common thereto. According to a further development the fixing elements have plates with which the hose elements are connected in tension-proof, but detachable manner. The fixing elements in particular have eyelet attachments for fixing to parts of a robot. As a result of such fixing elements the device according to the invention can be easily fixed to parts of a robot and can in particular subsequently be detached therefrom. According to a highly preferred development of the invention one eyelet attachment is connected to the carrousel of a robot and the other eyelet attachment is articulated to a robot rocker eccentrically to its A2 axis.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
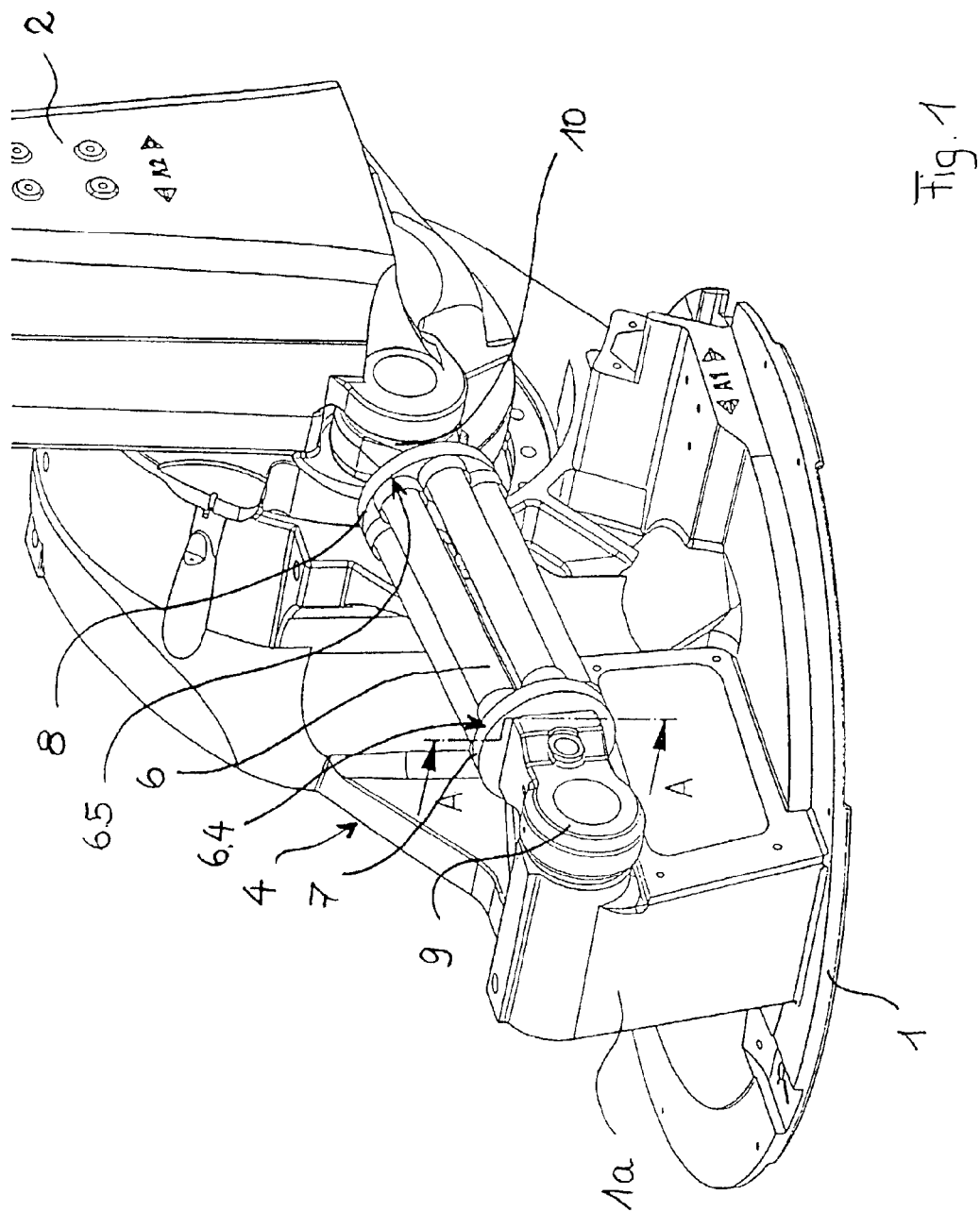
FIG. 1 is a carrousel and rocker of a robot together with a device according to the invention.

Referring to the drawings in particular, FIG. 1 shows the rotary table or carrousel 1 of a robot. Such a carrousel 1 is placed on a not shown robot base and is rotatable relative thereto about the vertical A1 axis. The rocker 2 is articulated to a robot carrousel 1 and is pivotable about the horizontal A2 axis of the robot at the lower end thereof. A motor is provided for pivoting the rocker 2. To ensure that the motor only has to carry out the pivoting work during the pivoting of the rocker 2 and does not have to completely compensate the forces or torques caused by gravitation, a weight compensation devices 4 is regularly provided for a robot between the carrousel 1 and the rocker 2, being articulated thereto eccentrically to the A2 axis.

The weight compensation devices 4 has, in the embodiment shown, a device with a plurality of parallel hose elements 6, which are preferably, as in the embodiment shown, arranged coaxially to an axis B surrounding the same. The ends of the hose elements 6 are fixed to transmit tensile forces to the connection plates 7, 8, which are in turn connected in one piece or firmly to the eyelet attachments 9, 10. The eyelet attachment 9 is firmly articulated to the carrousel 1 or a constructional element 1a thereof. The eyelet attachment 10 is articulated to the rocker 2 and, as stated, eccentric to the A2 axis.

Figure 2:
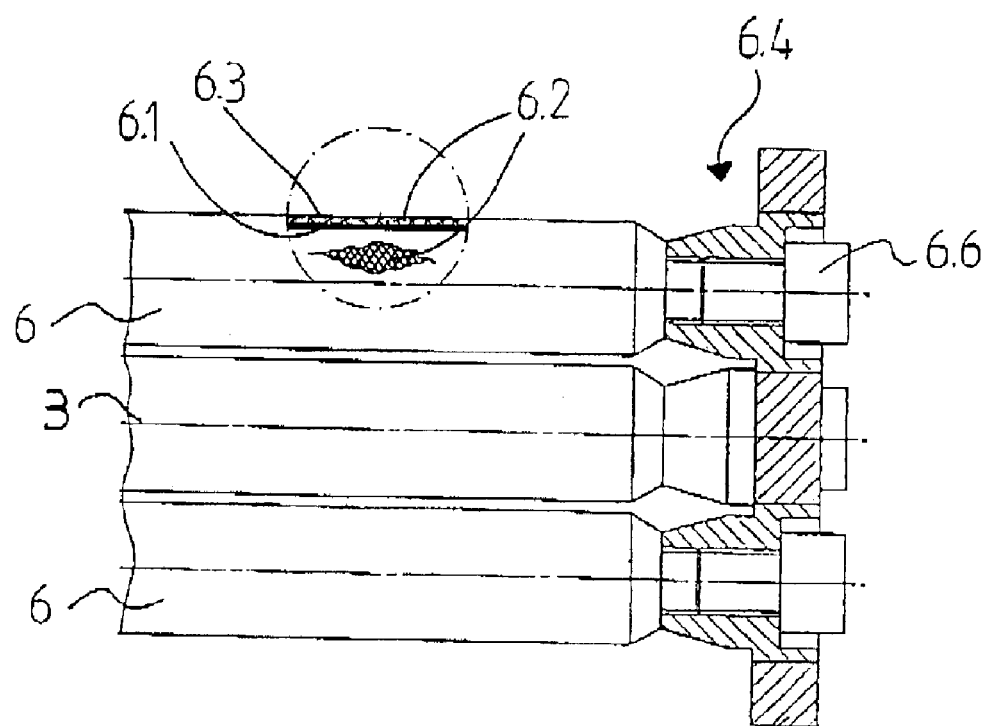
FIG. 2 is a partial sectional view of the coupling of several hose elements in a hose group corresponding to a section A—A of FIG. 1 viewing in accordance with arrows A, A.
Figure 3:
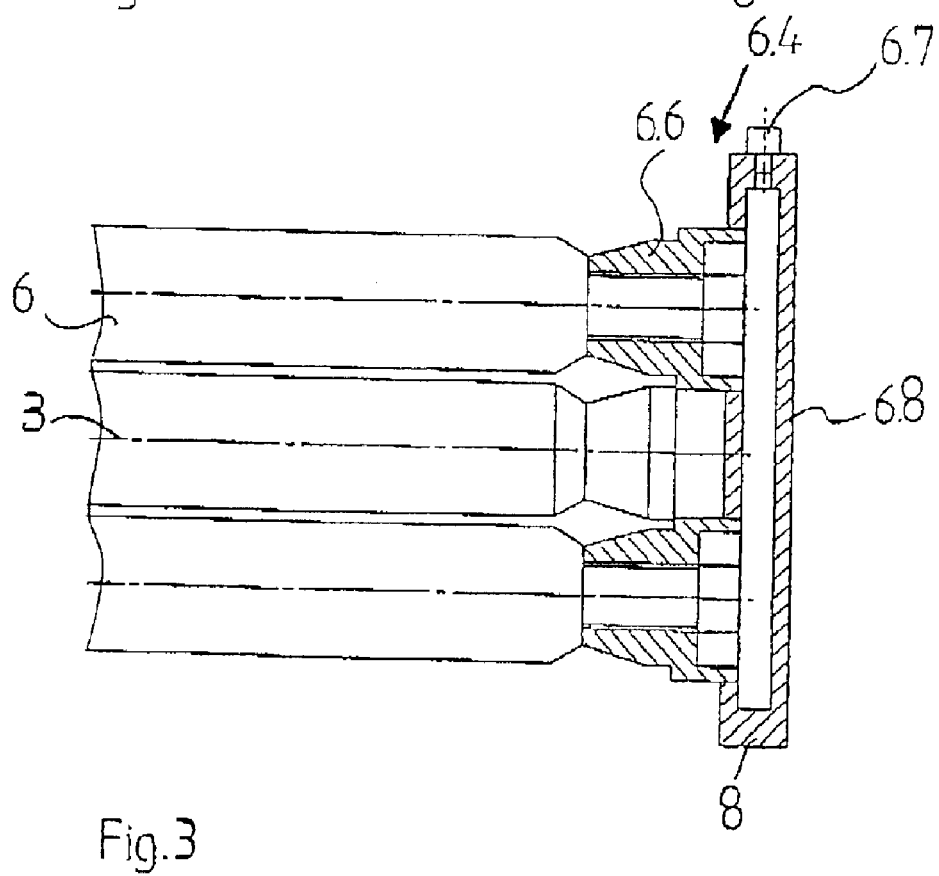
FIG. 3 is a partial sectional view of another variant of the coupling of several hose elements in a hose group corresponding to a section A—A of FIG. 1 viewing in accordance with arrows A, A.
Figure 4:
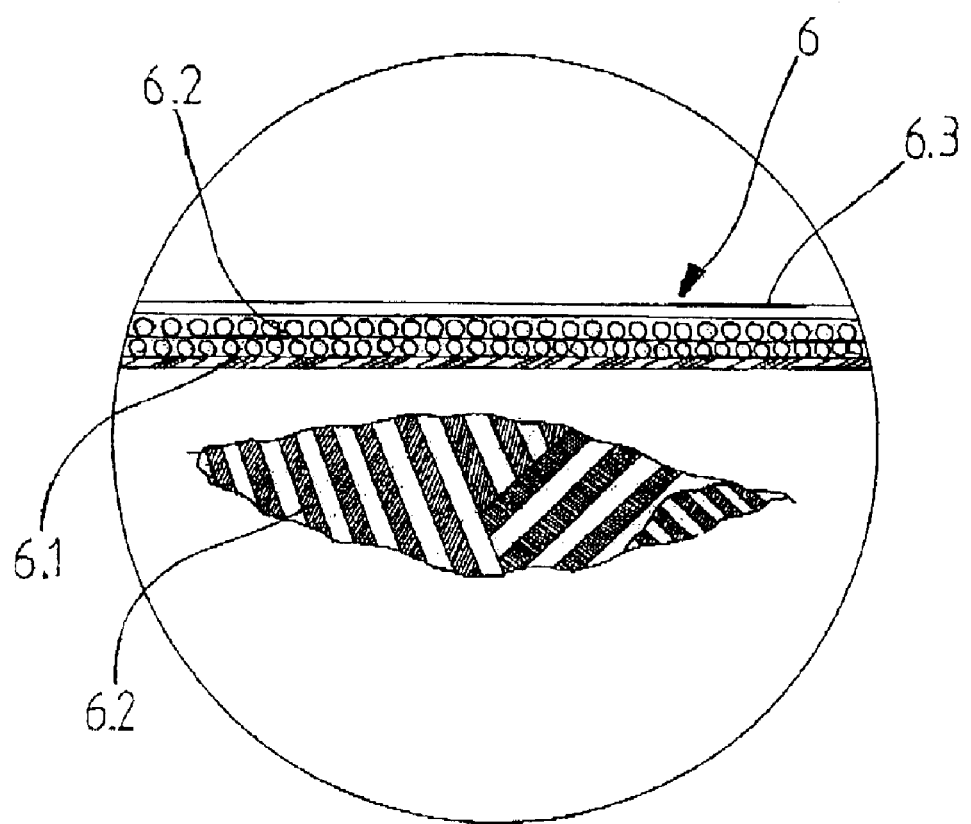
FIG. 4 is a sectional view of detail C of FIG. 2.

The hose elements 6 have a gas-tight inner hose 6.1, which is surrounded by a rhombic pattern of tension-proof or non elongatable (i.e., a part that can absorb tensile forces applied to its to ends and can offer a resistance to these pulling forces) fibers 6.2, which in the embodiment shown is in turn enclosed by a protective jacket 6.3. At their ends the hose parts including gas-tight inner hose 6.1 and fibers 6.2 are connected to connecting element 6.4 and opposite to connecting element 6.5. Fibers 6.2 are connected to parts 6.4 and 6.5 in a tension-proof manner. One of the connecting elements 6.5 is completely closed. In the case of the other connecting element 6.4, there is a connection 6.6 for filling the hose element 6. The connection 6.6 can consequently be screwed on using corresponding screw thread pins to the connection plates 7, 8. As a result there is a detachable fixing, so that the hose elements 6 can be released or detached from the connecting elements 7, 8 again, e.g. for pressure monitoring or refilling. In the construction according to FIG. 2 the hose elements 6 can in each case be individually filled and optionally also with a different pressure. An advantage is that in the case of the failure of one hose the system can still function. However effort and expenditure are higher for individual filling. In the construction of FIG. 3 a common filling takes place via a connector 6.8, a common inlet 6.7 and the connection 6.6.

The hose elements 6.1, 6.2 and 6.3 are under an internal pressure and for this purpose filled with a gas. As a result of the overpressure in the interior of the hose elements they widen radially and become shorter. If a tension is exerted on hose elements 6, if e.g. the rocker is moved out of the vertical position shown in FIG. 1 into a position inclined to a differing extent to the horizontal, there is a reduction to the diameter of the central area of the hose element 6. The invention gives rise to low-maintenance and also low-wear weight compensation devices, which have limited space requirements and low weight in the case of high flexibility with respect to the possible uses, because the filling pressure and length of the hose elements can be differently adjusted.

While specific embodiments of the invention have been shown and described in detail to illustrate the application of the principles of the invention, it will be understood that the invention may be embodied otherwise without departing from such principles.

What is claimed is:

1. A robot weight compensation device, comprising:
   a robot base with a vertical axis perpendicular to the circular shape of said robot base;
   a carousel rotatable around said vertical axis on said robot base;
   a rocker articulated to said carousel and rotatable about a horizontal axis by applied force created by a motor;
   at least two internally pressurized gas-tight hose elements reactively responding to said applied force to compensate and counteract tension of said applied force exerted to ends of the hose elements by an opposing reacting force, the gas-tight hose elements each being built up by an inner gas-tight hose;
   a fiber covering, said fiber covering including non-elongatable fibers oriented relative to an axis of each of the respective hose elements by an angle not equal to 0° and 90° and covering over each of the respective hose elements;
   an outer flexible protective jacket covering each fiber covering; and
   a first and a second fixing elements, each of the hose elements having an end and a distal end and/or the respective fiber covering being fixed by the respective fixing elements with said end of the two hose elements connected to a first fixing element, said first fixing element connected to a first robot part and said distal end of the hose elements connected to a second fixing element, said second fixing element connected to a second robot part that is moveable relative to the first robot part.

2. A device according to claim 1, further comprising additional substantially non-elongatable pressurized hose elements fixed by the ends to said fixing elements at each end.

3. A device according to claim 1, wherein said hose element is a flexible gas-tight inner hose and said fibers are non-elongatable fiber surrounding said flexible gas-tight inner hose.

4. A device according to claim 3, wherein the fibers are arranged in a manner forming a rhombic pattern.

5. A device according to claim 2, wherein the hose elements coaxially surround a central axis common thereto.

6. A device according to claim 1, wherein the fixing elements have plates with which the at least one hose element is connected in a detachable manner.

7. A device according to claim 6, wherein the fixing elements have eyelet attachments for fixing to parts of a robot.

8. A device according to claim 7, wherein one eyelet attachment is connected to a robot carrousel and the other eyelet attachment is articulated to a rocker of a robot eccentric to a rocker axis of the robot.

9. A robot weight compensation device, comprising:
   a plurality of internally pressurized gas-tight hose elements to reactively counteract and respond by an opposing force to compensate tension of an active force exerted to its ends, the gas-tight hose elements each being built up by an inner gas-tight hose;
   a fiber covering each of said hose elements, said fiber covering including non-elongatable fibers oriented relative to an axis of the respective hose elements by an angle not equal to 0° and 90° and covering over each of said hose elements respectively;
   an outer flexible protective jacket covering each fiber covering; and
   a first fixing element fixed to respective first ends of each of said gas-tight hose elements, each respective fiber covering and each respective outer flexible protective jacket;
   a second fixing element fixed to respective second ends of each of said gas-tight hose elements, each respective fiber covering and each respective outer flexible protective jacket;
   a robot carrousel rotatable about a carousel axis of a robot base, said first fixing element being articulated to said robot carrousel; and
   a rocker articulated to said carrousel at a location eccentric to said carousel axis, said rocker articulation defining a rocker axis offset from said carousel axis and at an angle to said carousel axis and rotatable about said rocker axis by said force created by a motor, said second fixing element being articulated to said rocker.

10. A device according to claim 9, wherein said gas-tight hose element is a flexible gas-tight inner hose and said fiber covering surrounds said flexible gas-tight inner hose.

11. A device according to claim 10, wherein the fibers are arranged in a rhombic manner.

12. A device according to claim 9, wherein the gas-tight hose element, fiber covering and outer flexible protective jacket coaxially surround a central axis common thereto.

13. A device according to claim 9, wherein the fixing elements have plates with which the fiber covering is fixed in a tension-proof, but detachable manner.

14. A device according to claim 9, wherein the fixing elements have eyelet attachments for fixing to parts of a robot.

15. A device according to claim 14, wherein one eyelet attachment is connected to a robot carousel and the other eyelet attachment is articulated to a rocker of a robot eccentric to a rocker axis of the robot.

16. A robot weight compensation device, comprising:
  a robot carousel rotatable about a carousel axis of a robot base;
  a rocker articulated to said carousel at a location eccentric to said carousel axis, said rocker articulation defining a rocker axis offset from said carousel axis and at an angle to said carousel axis, wherein said rocker rotates about said rocker axis by a force created by a motor;
  a first hose element with an internally pressurized gas tight inner hose portion and a high tensile strength outer position comprising non-elongatable fibers oriented relative to an axis of the inner hose portion element by an angle not equal to 0° and 90° and covering over said inner hose portion of said first hose element;
  an outer extensible flexible protective jacket covering said fibers of said first hose element;
  a second hose element with an internally pressurized gas tight inner hose portion and a high tensile strength outer portion comprising non-elongatable fibers oriented relative to an axis of the inner hose portion element by an angle not equal to 0° and 90° and covering over said inner hose portion of said second hose element;
  a second outer extensible flexible protective jacket covering said fibers of said second hose element;
  a first fixing element fixed to a first end of said first hose element and to a first end of second hose element, said first fixing element being connected to said robot carousel; and
  a second fixing element fixed to a second end of said first hose element and to a second end of said second hose element, said second fixing element being articulated to said rocker arm, wherein said first hose element, said outer extensible flexible protective jack, said second hose element, and said second outer extensible protective jacket together counterbalance said active force by a compensating opposing reacting force.

17. A robot having a robot weight compensation device comprising:
  a plurality of hose elements, each hose element including an internally pressurized gas-tight inner hose portion cooperating with a high tensile strength outer portion, the latter comprising non-elongatable fibers oriented relative to an axis of the respective hose element by an angle not equal to 0° and 90° and covering over said inner hose portion; an outer flexible protective jacket covering the fibers of each of said hose elements;
  a first fixing element fixed to a first end of the plurality of hose elements, said fixing element being connected to a robot carousel and a second fixing element fixed to a second end of the plurality of hose elements, said second fixing element being articulated to a rocker of a robot, the rocker being disposed articulated to said carousel at a location eccentric to said carousel axis of the robot, said rocker being movable relative to said robot carrousel by an active force created by a motor and said plurality of hose elements counteracts against said active force by an opposing reactively responding force.

18. The robot having a robot weight compensation device according to claim 16, further comprising additional substantially non-elongatable pressurized hose elements fixed by the ends to said fixing elements at each end.

19. The robot having a robot weight compensation device according to claim 16, wherein said hose element is a flexible gas-tight inner hose and said fibers are non-elongatable fibers surrounding said flexible gas-tight inner hose.

20. The robot having a robot weight compensation device according to claim 19, wherein the fibers are arranged in a manner forming a rhombic pattern.

* * * * *